United States Patent [19]

Yamamoto et al.

[11] Patent Number: 5,724,489
[45] Date of Patent: Mar. 3, 1998

[54] APPARATUS FOR AND METHOD OF GENERATING ROBOT TEACHING DATA ON OFFLINE BASIS

[75] Inventors: Masanao Yamamoto; Nobuhiro Okabe; Junichi Matsumoto; Shinsuke Taniguchi, all of Sayama, Japan

[73] Assignee: Honda Giken Kogyo Kabushiki Kaisha, Tokyo, Japan

[21] Appl. No.: 533,436

[22] Filed: Sep. 25, 1995

[51] Int. Cl.$^6$ .................. G05B 19/18; G05B 19/42
[52] U.S. Cl. .................. 395/80; 395/82; 395/85; 395/89; 395/93; 901/3; 901/7
[58] Field of Search .................. 395/80, 82, 85, 395/93, 89; 901/3, 7

[56] References Cited

U.S. PATENT DOCUMENTS

| | | | |
|---|---|---|---|
| 4,086,522 | 4/1978 | Engelberger et al. | 318/568 |
| 4,589,184 | 5/1986 | Asano et al. | 901/7 |
| 4,669,168 | 6/1987 | Tamura et al. | 901/7 |
| 4,799,581 | 1/1989 | Fujii | 901/7 |
| 4,998,050 | 3/1991 | Nishiyama et al. | 395/83 |
| 5,207,309 | 5/1993 | Simpkin et al. | 901/7 |
| 5,370,745 | 12/1994 | Litteral | 118/669 |

FOREIGN PATENT DOCUMENTS

| | | |
|---|---|---|
| 61-11808 | 1/1986 | Japan. |
| 62-54688 | 3/1987 | Japan. |
| 3-154103 | 7/1991 | Japan. |

*Primary Examiner*—George B. Davis

[57] ABSTRACT

A conveyor controller calculates a distance which a conveyor is to move to convey a workpiece, and a simulated model of the conveyor is moved by a conveyor moving circuit. The calculated distance is converted into conveyor movement pulses by an encoder circuit, and the conveyor movement pulses are stored in a memory. A robot controller operates a simulated model of a coating robot in synchronism with the movement of the conveyor, based on statuses of simulated models of limit switches which are set by a limit switch controller. Statuses of operation of the simulated models are displayed on a display unit.

5 Claims, 8 Drawing Sheets

APPARATUS FOR AND METHOD OF GENERATING ROBOT TEACHING DATA ON OFFLINE BASIS

BACKGROUND OF THE INVENTION

1. Field of the Invention

The present invention relates to an apparatus for and a method of generating robot teaching data on an offline basis in facilities where a workpiece and a working robot operate in coaction with each other.

2. Description of the Related Art

Modern production facilities such as factories employ many working robots for performing desired processing such as machining on workpieces. It has been customary for the operator to teach a working robot by operating the working robot along a desired path with a teach pendant or the like and storing data of the operation for playback. Such a teaching process is known as a teaching playback process.

According to the teaching playback process, however, it is necessary to shut off the production facility while the working robot is being taught. Therefore, the production efficiency of the production facility is lowered, or the teaching playback process has to be done at night.

To alleviate the above drawbacks, there has been developed an offline teaching apparatus for generating teaching data by operating a working robot on a production facility model that is simulated by a computer. The generated data is finally adjusted by actually operating an actual working robot in a production facility based on the data generated by the offline teaching apparatus.

The conventional offline teaching apparatus is capable of teaching a working robot an operation path with respect to a workpiece. However, if a working robot is required to work on a workpiece that is being fed by a conveyor or the like, then it has been difficult for the conventional offline teaching apparatus to teach the working robot taking into account the movement of the workpiece. For such an application, it has been the conventional practice to teach the working robot for its path while the workpiece is being held at rest, and correct the generated data taking into account the movement of the workpiece when the data is reproduced on an actual production facility. This practice has been problematic because the danger of physical interference is high as the operator operates the working robot on a trial-and-error basis for correcting the generated data, and also because it takes a long period of time until the finally completed teaching data is obtained.

SUMMARY OF THE INVENTION

It is a general object of the present invention to provide an apparatus for and a method of generating robot teaching data on an offline basis efficiently while reducing burdens on the operator and without shutting down the production facility.

A principal object of the present invention is to provide an apparatus for and a method of generating robot teaching data with ease in facilities where a workpiece and a working robot operate in coaction with each other.

The above and other objects, features, and advantages of the present invention will become more apparent from the following description when taken in conjunction with the accompanying drawings in which a preferred embodiment of the present invention is shown by way of example.

DETAILED DESCRIPTION OF THE PREFERRED EMBODIMENT

Figure 1:
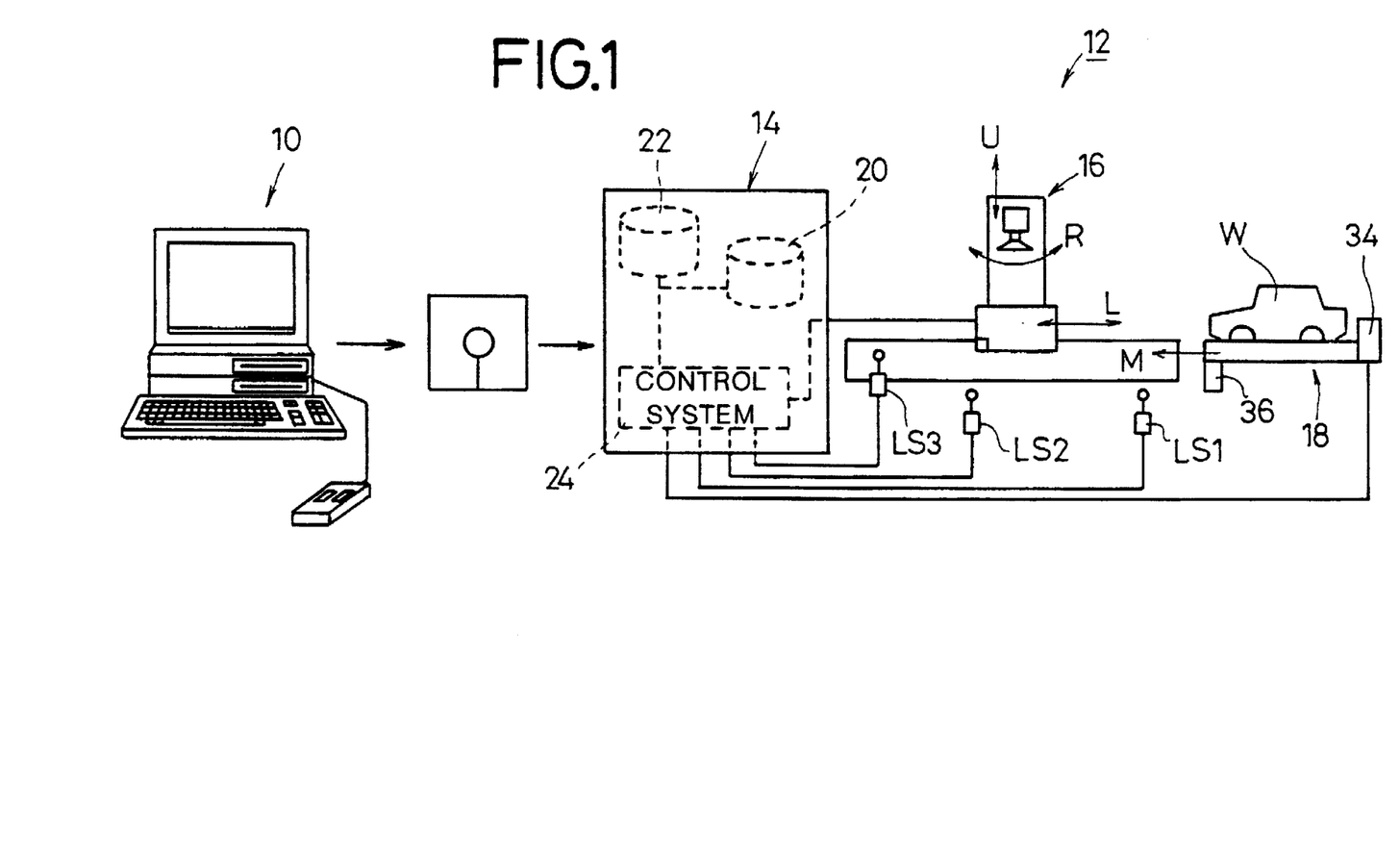
FIG. 1 is a schematic front elevational view of an offline teaching apparatus according to the present invention and a working station which is controlled by robot teaching data generated by the offline teaching apparatus.

FIG. 1 shows an offline teaching apparatus 10 according to the present invention and a working station 12 which is controlled by robot teaching data generated by the offline teaching apparatus 10.

The working station 12 basically comprises a robot controller 14, a coating robot 16 controlled by the robot controller 14, and a conveyor 18 for feeding a workpiece W to be coated by the coating robot 16. The coating robot 16 coats the workpiece W which is fed in the direction indicated by the arrow M by the conveyor 18.

The robot controller 14 comprises a job data file 20 for storing teaching data supplied from the offline teaching apparatus 10 through a floppy disk (FD) or the like, as job data for controlling the coating robot 16, a conveyor data file 22 for string control information with respect to speed and direction of movement of the conveyor 18, as conveyor data for controlling the conveyor 18, and a control system 24 for controlling the coating robot 16 based on the job data and the conveyor data. The teaching data may be supplied from the offline teaching apparatus 10 through an online communication line to the robot controller 14 on an online basis.

The coating robot 16 comprises a robot body 28 linearly movable in the directions indicated by the arrows L along a guide mechanism 26, and a coating gun 30 linearly movable in the directions indicated by the arrows U along the robot body 28 and angularly movable in the directions indicated by the arrows R. The working station 12 has a start limit switch LS1 for starting to operate the coating robot 16 in synchronism with the conveyor 18, a cancel limit switch LS2 for canceling a standby mode of the coating robot 16, and a stop limit switch LS3 for stopping operation of the coating robot 16 in synchronism with the conveyor 18, the limit switches LS1, LS2, LS3 being positioned at spaced locations on the guide mechanism 26. The robot body 28 has a dog 32 for turning on and off the limit switch LS3.

The start limit switch LS1 detects the conveyor 18, and supplies a signal to start operating the coating robot 16 in synchronism with the conveyor 18 to the robot controller 14. The cancel limit switch LS2 detects the conveyor 18, and supplies a signal to start a coating operation of the coating robot 16 to the robot controller 14. The stop limit switch LS2 detects the conveyor 18 in coaction with the dog 32, and supplies a signal to stop operation of the coating robot 16 in synchronism with the conveyor 18 to the robot controller 14.

The conveyor 18 serves to move the workpiece W in the direction indicated by the arrow M along the guide mechanism 26 of the coating robot 16. The conveyor 18 has an encoder 34 for calculating the position of the conveyor 18 and a dog 36 for turning on and off the start limit switch LS1 and the cancel limit switch LS2 of the coating robot 16.

Figure 2:
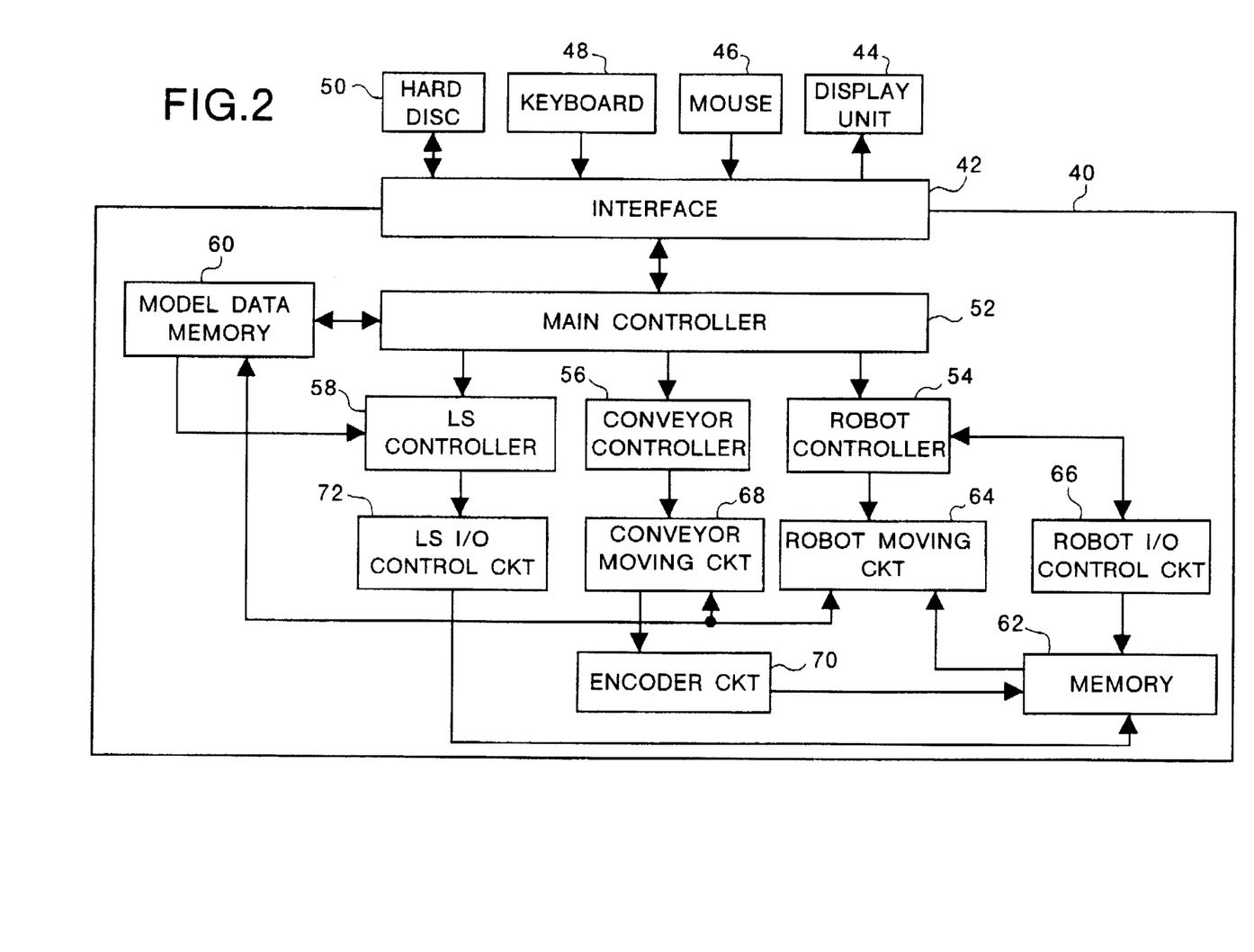
FIG. 2 is a block diagram of a circuit arrangement of the offline teaching apparatus shown in FIG. 1.

FIG. 2 shows the functions of the offline teaching apparatus 10 which generates a simulated model of the working station 12 shown in FIG. 1.

The offline teaching apparatus 10 comprises a main section 40, a display unit 44, a mouse 46, a keyboard 48, and a hard disk 50 which are connected to the main section 40 through an interface The main section 40 has a main controller 52 for controlling the main section 40 in its entirety. The main controller 52 controls a robot controller 54 (robot control means) for controlling the coating robot 16 as a simulated model, a conveyor controller 56 (workpiece movement control means) for controlling the conveyor 18 as a simulated model, and a limit switch controller 58 (workpiece monitor means) for controlling the start limit switch LS1, the cancel limit switch LS2, and the stop limit switch LS3 as a simulated model. The main controller 52 functions as environment setting means for setting data of the simulated models as environment model data, and teaching data setting means for setting the working position and the speed of the coating robot 16 in the environment model data as teaching data. The environment model data and a position in which it is set are stored in a model data memory 60, and the teaching data and data of the speed of the Conveyor 18 are stored in the hard disk 50.

The robot controller 54 determines instructions from the main controller 52. If an instruction from the main controller 52 is a command to move the coating robot 16, then the robot controller 54 calculates a distance which the coating robot 15 is to move. If an instruction from the main controller 52 is a command to input and output data, then the robot controller 54 outputs an I/O number and a status of data to be inputted and outputted. If an instruction from the main controller 52 is an indication of the conveyor 18, then the robot controller 54 outputs an indicated conveyor number. If an instruction from the main controller 52 is a shift command, then the robot controller 54 calculates a distance which the coating robot 16 is to be shifted. To the robot controller 54, there are connected a robot moving circuit 64 (functions as speed correcting means) for moving the simulated model of the coating robot 16 based on the distance which the coating robot 15 is to move and the conveyor position supplied from a memory 62, and a robot input/output control circuit 66 for storing the I/O number, the conveyor number, and the distance which the coating robot 16 is to be shifted into the memory 62. The position of the simulated model of the coating robot 16 is stored in the model data memory 60.

The conveyor controller 56 calculates a distance which the conveyor 18 is to move based on the conveyor speed data stored in the hard disk 50, and outputs the calculated distance to a conveyor moving circuit 68 to move the simulated model of the conveyor 18. The calculated distance supplied to the conveyor moving circuit 68 is converted into conveyor pulse data by an encoder circuit 70 (position calculating means) corresponding to the encoder 34, and the conveyor pulse data is stored in the memory 62. The position of the simulated model of the conveyor 18 is stored in the model data memory 60.

The limit switch controller 58 manages the statuses of the start limit switch LS1, the cancel limit switch LS2, and the stop limit switch LS3 as the simulated model, based on the positional data of the simulated model from the model data memory 60. The I/O number and the status signal from the limit switch controller 58 are supplied to a limit switch input/output control circuit 72, which stores the I/O number and the status signal into the memory 62.

Operation and advantages of the offline teaching apparatus 10 of the above structure will be described below.

Figure 3:
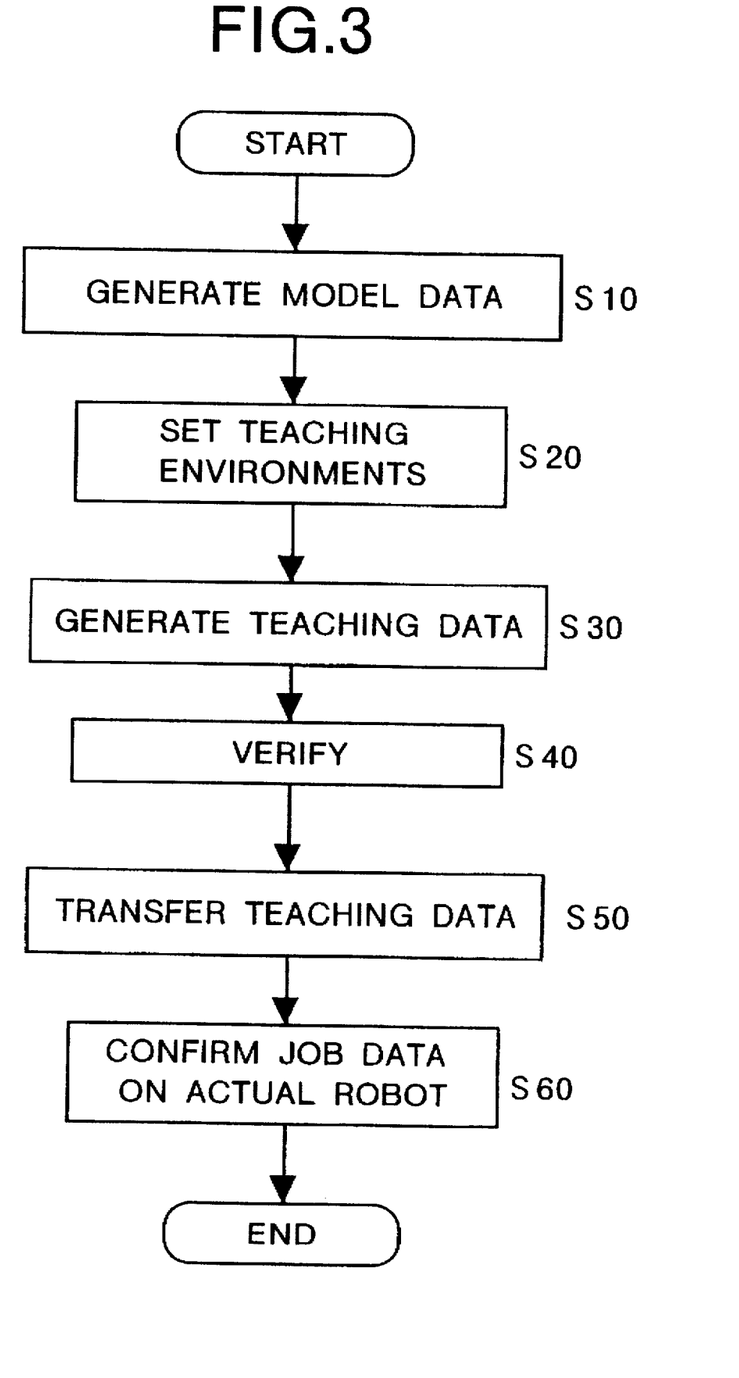
FIG. 3 is a flowchart of a procedure for generating robot teaching data.
Figure 4:
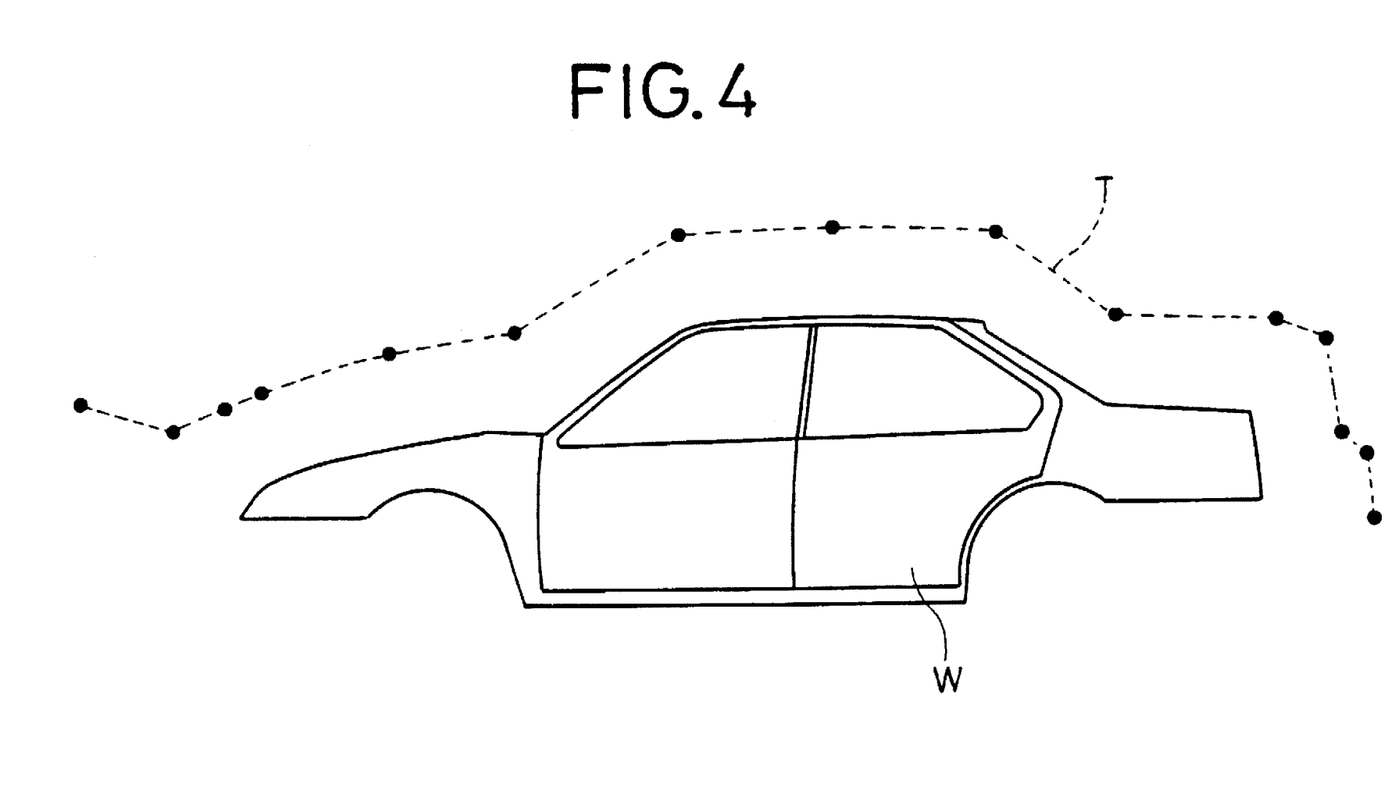
FIG. 4 is a view illustrative of a coating path followed by a coating robot Which is shown in FIG. 1.

A procedure for generating robot teaching data will be described below with reference to FIG. 3.

The operator assumes the working station 12 shown in FIG. 1, generates model data including those of the coating robot 16, the conveyor 18, the shape of the workpiece W, the start limit switch LS1, the cancel limit switch LS2, and the stop limit switch LS3, and then stores the generated model data in the model data memory 60 in a step S10. Thereafter, the operator determines parameters of the above model data, an installation position, and the speed and direction of movement of the conveyor 18, and assigns I/O numbers to the start limit switch LS1, the cancel limit switch LS2, and the stop limit switch LS3 in a step S20. After the above preparatory process, the operator teaches the simulated model of the coating robot 16 coating positions with respect to the simulated model of the workpiece W in a step S30. This teaching process is carried out, for example, by tracing the simulated model, displayed on the display unit 44, of the coating gun 30 of the coating robot 16 along a path T with respect to the simulated model, displayed on the display unit 44, of the workpiece W, using the mouse 46 or the like. The produced teaching data is stored, together with the speed and direction of movement of the conveyor 18, into the hard disk 50.

Then, in the offline teaching apparatus 10, while the simulated model of the conveyor 18 is moving, the simulated model of the coating robot 16 is operated based on the teaching data for thereby verifying the operation of the simulated model of the working station 12 in a step S40. The verifying process will be described in detail later on.

If the operation is verified, then the teaching data is transferred to the robot controller 14 shown in FIG. 1 and converted into job data, which is then stored into the job data file 20 in a step S50. The coating robot 16 is now actuated based on the job data, and the job data is confirmed on the actual coating robot 16 in a step S60.

Figure 5:
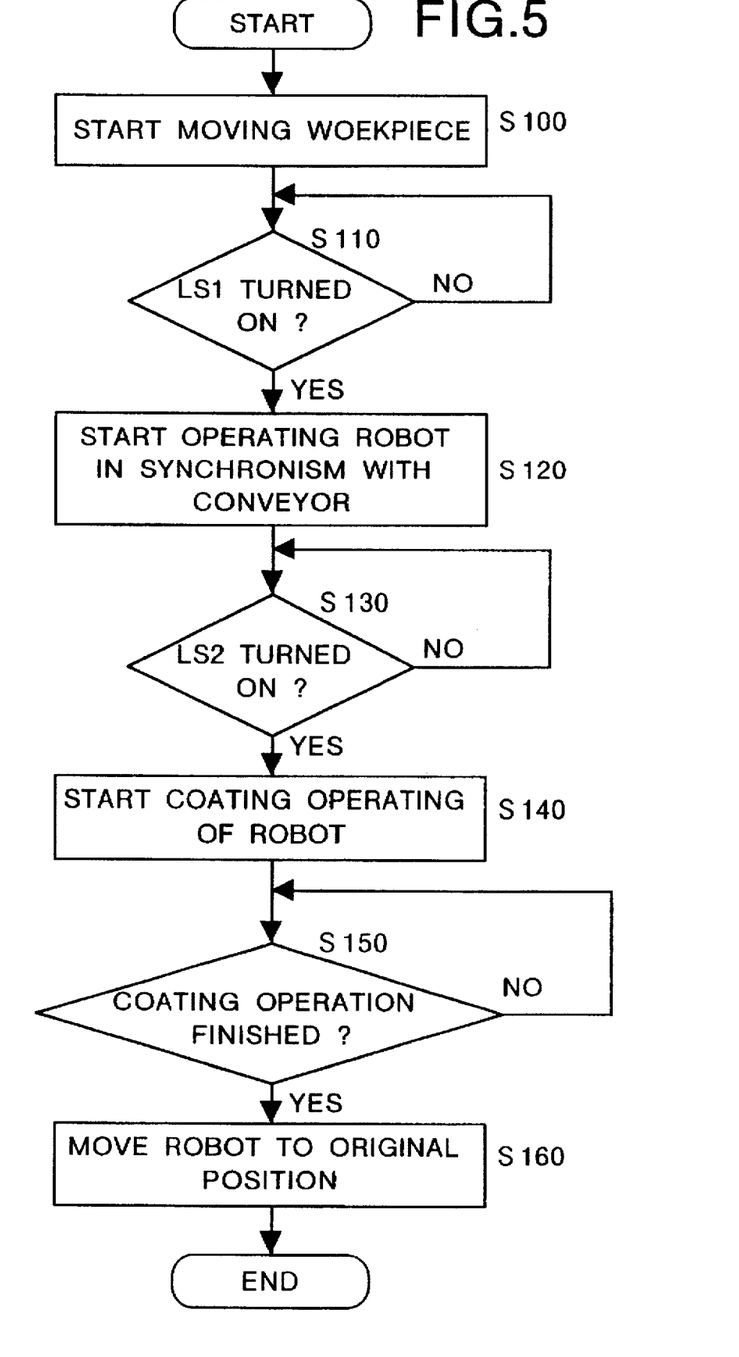
FIG. 5 is a flowchart of an operation sequence of the working station shown in FIG. 1.

An operation sequence of the actual working station 12 shown in FIG. 1 will be described below with reference to FIG. 5.

Initially, the coating robot 16 is positioned in an original working position, and the workpiece W then starts moving in the direction indicated by the arrow M with the conveyor 18 in a step S100. When the conveyor 18 has moved a given distance and the dog 36 turns on the start limit switch LS1 in a step S110, the coating robot 16 starts moving along the guide mechanism 26 at the same speed and in the same direction as the conveyor 18 in response to a signal from the control system 24 in a step S120. Then, when the dog 36 turns on the cancel limit switch LS2 in a step S130, the coating robot 16 starts coating the workpiece W with the coating gun 30 in response to a signal from the control system 24 in a step S140. The coating process is disabled while the conveyor 18 is moving from the start limit switch LS1 to the cancel limit switch LS2 because the coating process needs to be started from the position of the cancel limit switch LS2 to avoid physical interference between the coating robot 16 and other device in the working station 12. The coating process is carried out in synchronism with the operation of the conveyor 18. When the coating process is fully completed, the coating robot 16 moves to the stop limit switch LS3, causing the dog 32 to turn on the stop limit switch LS3 for thereby enabling the control system 24 to recognize an end of the coating process in a step S150. Finally, the coating robot 16 moves back to the original working position in a step S160, in readiness for coating a next workpiece W.

A process of playing back the above operation of the actual coating robot 16 in the offline teaching apparatus 10 will be described below.

The main controller 52 reads job data generated based on the teaching data from the hard disk 50, and operates the robot controller 54, the conveyor 56, and the limit switch controller 58 in a time-sharing manner according to respective instructions of the job data.

Figure 6:
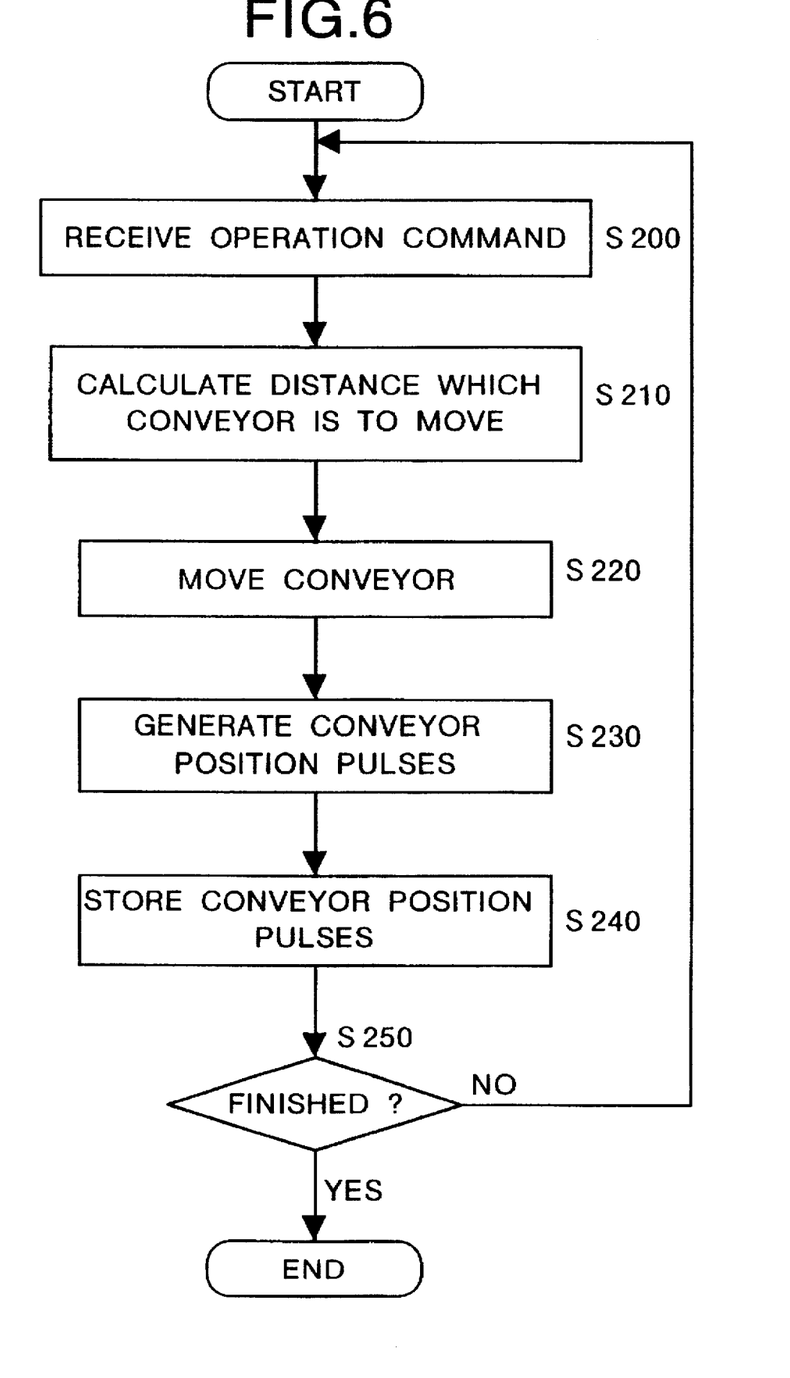
FIG. 6 is a flowchart of an operation sequence of a conveyor controller shown in FIG. 2.

The operation of the conveyor 16 is played back by the conveyor controller 56 according to an operation sequence shown in FIG. 6. The conveyor controller 56 receives an operation command and data of the speed and direction of movement of the conveyor 18 from the main controller 52 in a step S200, and calculates a distance which the conveyor 18 is to move in a step S210. The calculated distance is supplied to the conveyor moving circuit 38, which moves the Simulated model of the conveyor 18 in a step S220. Specifically, the data of the distance which the conveyor 18 is to move is supplied to the model data memory 60, establishing a new position for the simulated model of the conveyor 18. The new position for the simulated model of the conveyor 18 is processed into graphic data by the main controller 52, and displayed on the display unit 44 through the interface 42.

The encoder circuit 70 receives the data of the distance which the conveyor 18 is to move from the conveyor moving circuit 68, and stores the data as conveyor position pulses in the memory 62 in steps s 230, S240. In the memory 62, the conveyor position pulses are stored in a location indicated by an I/O number from the robot input/output control circuit 66. The above operation is carried out until the job data is finished in a step S250.

Figure 7:
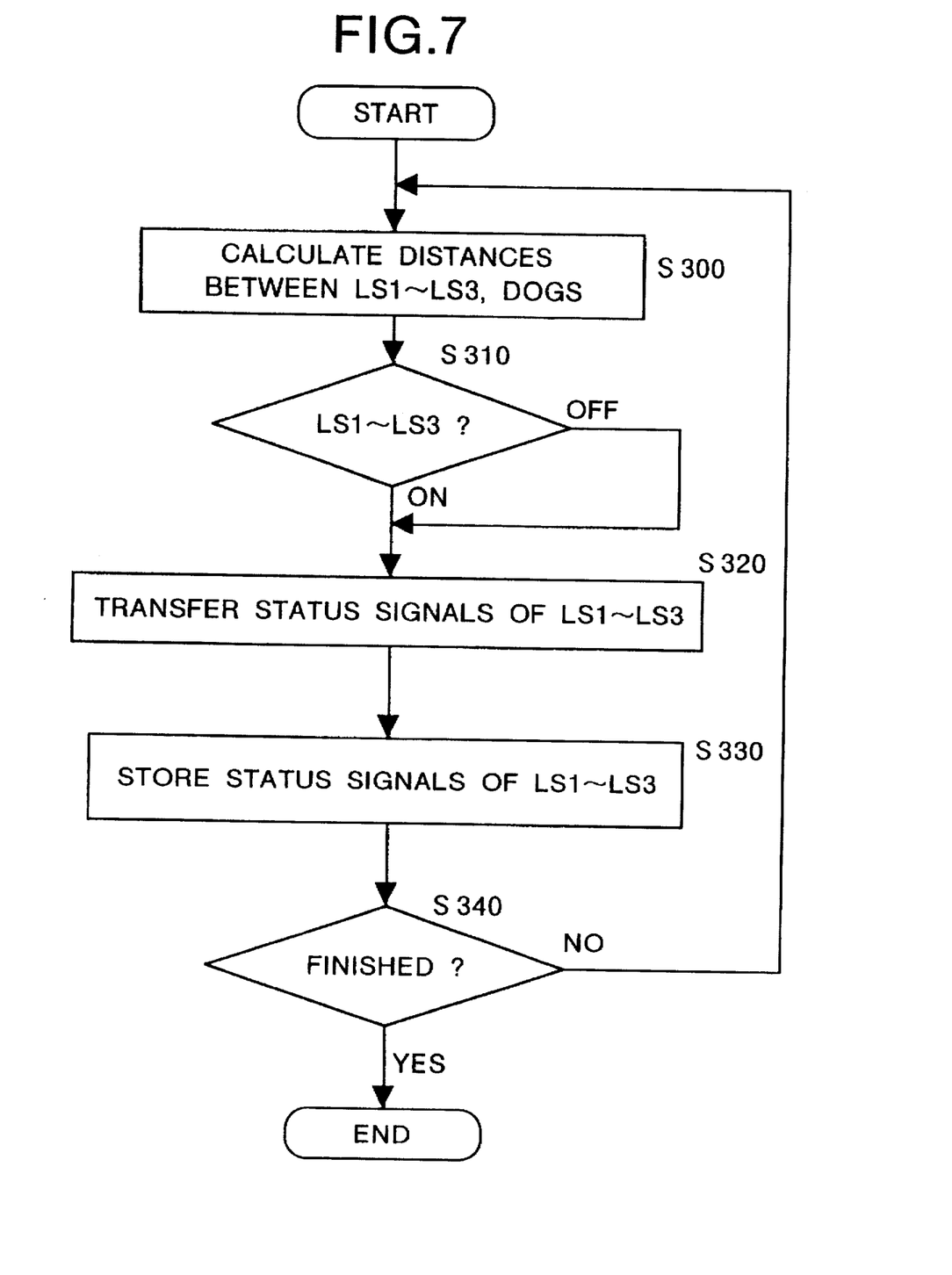
FIG. 7 is a flowchart of an operation sequence of a limit switch controller shown in FIG. 2.

Then, the operation of the start limit switch LS1, the cancel limit switch LS2, and the stop limit switch LS3 is played back by the limit switch controller 58 according to an operation sequence shown in FIG. 7. The limit switch controller 58 calculates distances between the positions of the simulated models of the start limit switch LS1, the cancel limit switch LS2, and the stop limit switch LS3, and a distance between the positions of the simulated models of the dogs 32, 36 which are established according to the distance data from the robot moving circuit 64 and the conveyor moving circuit 68, from these positions in a step S300. Then, the limit switch controller 58 monitors the ON/OFF statuses of the simulated models of the start limit switch LS1, the cancel limit switch LS2, and the stop limit switch LS3, based on the calculated distances in a step S310. The monitored statuses are stored into the memory 62 by the limit switch input/output control circuit 72 in steps S320, S330. In the memory 62, the statuses of the start limit switch LS1, the cancel limit switch LS2, and the stop limit switch LS3 are stored in respective locations indicated by I/O numbers from the robot input/output control circuit 66. The above operation is carried out until the job data is finished in a step S340.

Figure 8:
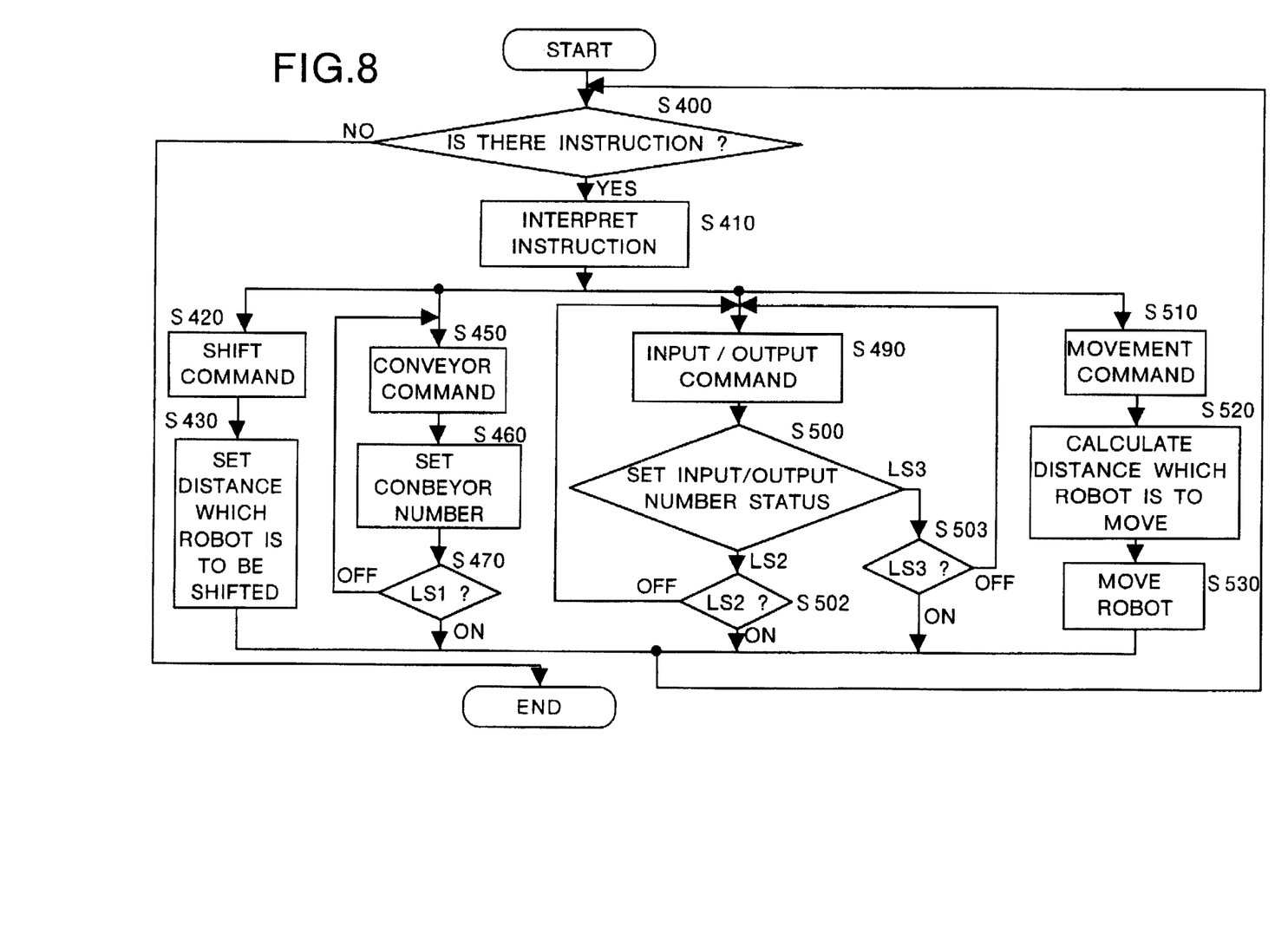
FIG. 8 is a flowchart of an operation sequence of a robot controller shown in FIG. 2.

The operation of the coating robot 16 is played back by the robot controller 54 according to an operation sequence shown in FIG. 8. The robot controller 54 receives an instruction from the main controller 52 in a step S400, and interprets the received instruction in a step S410.

If the instruction is a command for shifting the coating robot 16 in a step S420, then a given distance which the coating robot 16 is to be shifted is stored into the memory 62 through the robot input/output control circuit 60 in a step S430. In the case Where the length of the guide mechanism 26 is limited, i.e., the entire distance which the coating robot 16 can move is limited, the workpiece W to be coated is divided into regions, and the distance which the coating robot 16 is to be shifted is defined as a distance which the coating robot 16 is to move with respect to each of the divided regions of the workpiece W to be coated.

If the instruction is a conveyor command in a step S450, the conveyor number is set in the memory 62 by the robot input/output control circuit 66 in a step S460. The conveyor number serves to indicate a conveyor for conveying the workpiece W to be coated.

At the time the job data of the robot controller 54 starts, the simulated model of the conveyor 18 has already started to move with the conveyor controller 56 (see the step S220 in FIG. 6). The robot controller 54 monitors the status of the simulated model of the start limit switch LS1 which has been set in the memory 62 by the limit switch input/output control circuit 72, through the robot input/output control circuit 66, and confirms when the simulated model of the dog 36 turns on the simulated model of the start limit switch LS1 in a step S470.

If the instruction is an input/output command in a step S490, then the robot input/output control circuit 66 sets an I/O number and its status in the memory 62 in a step S500. The input/output command is a command for carrying out a next operation based on whether the cancel limit switch LS2 and the stop limit switch LS3 are turned on or off. In this embodiment, the input/output command is set such that a next operation is carried out if the cancel limit switch LS2 and the stop limit switch LS3 are turned on. Then, it is confirmed when the simulated models of the cancel limit switch LS2 and the stop limit switch LS3 are turned on in steps S502, S503.

If the instruction is a movement command in a step S510, the robot controller 54 calculates a distance which the coating robot 16 is to move, in view of the conveyor position data and the distance which the coating robot 16 is to be shifted in a step S520. The simulated model of the coating robot 16 now starts moving based on the calculated distance in a step S530. The data relative to the calculated distance is supplied to the model data memory 60, establishing a new position for the simulated model of the coating robot 16. The new position for the simulated model of the coating robot 16 is processed into graphic data by the main controller 52, and displayed on the display unit 44 through the interface 42. Thereafter, the processing of instructions is continued. In the absence of any instruction, the processing is finished.

As described above, the simulated model of the coating robot 16 is operated in synchronism with the movement of the workpiece W which is effected by the simulated model of the conveyor 18, for thereby simulating a coating process. In this manner, operation of the actual coating robot 16 can be played back by the offline teaching apparatus 10. As a result, the operator can check the coating robot 16 for its operation and physical interference with other devices on an offline basis, and can generate highly accurate robot teaching data. Therefore, any correction of the robot teaching data for the actual coating robot 16 is minimized, and any adverse effect which such data correction may have on the working station 12 is reduced.

According to the present invention, therefore, when robot teaching data for controlling a working robot to work on a workpiece which is being moved is generated, the operation of the working robot can be played back accurately taking into account the movement of the workpiece by the offline teaching apparatus. Consequently, the operator can confirm accurately whether the generated robot teaching data is acceptable or not. As a result, the robot teaching data can be generated highly accurately by an offline robot teaching process in a manner to minimize any data correction with respect to the actual working robot.

Although a certain preferred embodiment of the present invention has been shown and described in detail, it should be understood that various changes and modifications may be made therein without departing from the scope of the appended claims.

What is claimed is:

1. An offline teaching apparatus for generating robot teaching data on an offline basis in a facility where a workpiece and a working robot operate in coaction with each other, comprising:

environment setting means for setting working environments for a working robot, workpiece moving means for moving a workpiece, and workpiece detecting means for detecting a workpiece, as environment model data;

teaching data setting means for setting at least a position and speed of the working robot with respect to the workpiece, as robot teaching data;

workpiece movement control means for controlling movement of said workpiece moving means according to the environment model data;

workpiece monitor means for monitoring a status of the workpiece detected by said workpiece detecting means according to the environment model data;

position calculating means for calculating a position of the workpiece moving means according to the environment model data;

speed correcting means for correcting the speed of the working robot in the robot teaching data based on said position calculated by said position calculating means, after said workpiece monitor means has confirmed the detection of the workpiece by said workpiece detecting means; and robot control means for controlling operation of the working robot according to the environment model data based on the robot teaching data according to the corrected speed of the working robot.

2. An offline teaching apparatus according to claim 1, wherein said working robot according to the environment model data operates in synchronism with movement of the workpiece by said workpiece moving means according to the environment model data.

3. An offline teaching apparatus according to claim 1, wherein said environment model data for the workpiece detecting means includes environment model data for means for generating signals to start and stop operating the working robot in synchronism with said workpiece moving means.

4. An offline teaching apparatus according to claim 1, wherein said workpiece movement control means comprises means for controlling movement of the workpiece moving means according to the environment model data based on data of a speed and direction of said workpiece moving means.

5. An offline teaching apparatus according to claim 1, further comprising display means for displaying operation of the working robot according to the environment model data, as controlled by said robot control means.

* * * * *